(12) United States Patent
Brunswig

(10) Patent No.: US 8,479,111 B2
(45) Date of Patent: Jul. 2, 2013

(54) SIMPLIFIED VIEWS OF META MODEL ENTITIES OF DATA OBJECTS

(75) Inventor: Frank Brunswig, Heidelberg (DE)

(73) Assignee: SAP AG, Walldorf (DE)

( * ) Notice: Subject to any disclaimer, the term of this patent is extended or adjusted under 35 U.S.C. 154(b) by 231 days.

(21) Appl. No.: 12/916,423

(22) Filed: Oct. 29, 2010

(65) Prior Publication Data

US 2012/0110488 A1 May 3, 2012

(51) Int. Cl.
*G06F 15/00* (2006.01)
*G06F 13/00* (2006.01)

(52) U.S. Cl.
USPC .......................................... 715/771; 715/853

(58) Field of Classification Search
USPC ................. 715/771, 751, 753, 851, 763–765, 715/736–738
See application file for complete search history.

(56) References Cited

U.S. PATENT DOCUMENTS 6,636,242 B2 * 10/2003 Bowman-Amuah .......... 715/764
2011/0125553 A1 * 5/2011 Mazzoleni et al. .......... 705/7.37

* cited by examiner

*Primary Examiner* — Cao "Kevin" Nguyen
(74) *Attorney, Agent, or Firm* — Mintz Levin Cohn Ferris Glovsky and Popeo, P.C.

(57) ABSTRACT

Simplifying views of meta model entities of data objects can include determining, using a distribution function calculated for each data element of a plurality of data elements available for use in executing a business process in an object-based software platform, a usage frequency ranking of the plurality of data elements. Based on the usage frequency ranking, a plurality of subsets of most frequently used data elements of the plurality of data elements can be identified. Each subset of the plurality of subsets can include a fraction of the plurality of data elements based on a threshold level of complexity. A selection of a desired complexity setting can be received from a user via a user interface. The desired complexity setting can correspond to the threshold level of complexity of one of the plurality of subsets. The user interface can display only the data elements included in the subset with the corresponding level of complexity. Computer program products, systems, and methods having similar features are also described.

20 Claims, 8 Drawing Sheets

SIMPLIFIED VIEWS OF META MODEL ENTITIES OF DATA OBJECTS

TECHNICAL FIELD

The subject matter described herein relates to providing simplified views of meta model entities of data objects, which can include business objects, for example as part of a developer user interface for designing business processes in business software applications.

BACKGROUND

Data objects, which can in some cases be referred to as business objects, can function as core entities for data consumers in some business software applications. Data consumers can include, but are not limited to, user interfaces, form viewers, agents for processing inbound and/or outbound data, and the like. A data object can include one or more data elements. The term data element, as used herein, can refer to any data format, including but not limited to a data object or business object, a node or a root node of a data or business object, meta model entity of a data or business object, and the like. Data elements can have one or more dependencies upon other data elements, often in a uni-directional manner. The term dependency, as used herein, can refer to any unidirectional relationship between data elements, in which a dependent data element accesses data, metadata, data formats or structures, or the like from a depended upon data element. A data element can also include any feature of the meta-model of a business or data object including, but not limited to, a node, an action, a query, an association, an action parameter, a query input parameter, a node element, and the like.

As an example, a data element, such as a data object node, can be both a parent data object node and a child data object node in a web of inter-nodal dependencies and can depend on any number of child data object nodes and have any number of parent data object nodes that depend upon it. In a typical business software system, metadata can be distributed into meta-objects. A where-used list can be used in some systems to ensure metadata consistency and to make dependencies between meta-object instances transparent. Due to the typically one-way nature of inter-element dependencies, the data objects or data elements that depend upon data or data elements in a given data object are usually not known to or stored within that given data object. As used herein, the term "where-used data" refers to an index, listing, or the like that contains information pertaining to associations or dependencies between data elements, for example data objects, nodes, or the like, of an object-based software solution.

SUMMARY

In one aspect, a computer-implemented method includes determining, using a distribution function calculated for each data element of a plurality of data elements available for use in executing a business process in an object-based software platform, a usage frequency ranking of the plurality of data elements. Based on the usage frequency ranking, a plurality of subsets of most frequently used data elements of the plurality of data elements is identified. Each subset of the plurality of subsets includes a fraction of the plurality of data elements based on a threshold level of complexity. A selection of a desired complexity setting corresponding to the threshold level of complexity of one of the plurality of subsets is received from a user via a user interface, the desired complexity setting, and only the data elements included in the subset with the corresponding level of complexity are displayed in the user interface.

In optional variations, one or more of the following features can be included. The distribution function can include at least one histogram indicating a relative number of calls to each of several types of data elements by other data elements in a software solution. The distribution function can be calculated based on a where-used index that lists, for each data element of the plurality of data elements, all other data elements having a dependency upon that data element. The dependency can include one or more of a query, an action, a parent-child association, an intra-object association, and a cross-object association. The calculating can occurs at runtime such that the distribution function reflects all updates to the where-used index. The where-used list used for calculation of the distribution function can be selected based on at least one of a user role of the user and a specific business application development area within which the business process is executed. Each data element can include one of a node, an action, a query, an association, an action parameter, a query input parameter, and a node element.

Articles are also described that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The subject matter described herein provides many advantages. For example, an approach to dynamically and automatically adapting the complexity of a view of available data elements based on a where-used distribution function such as is disclosed herein does not require effort by a developer to categorize the various data elements because selection of data elements to be displayed based on the user's complexity preference can be based on active data obtained from the meta-data repository. The content of where-used lists can expand with an ongoing lifecycle of the underlying software solution. As such, more data can become available for use in refining the distribution functions so that the quality of the different simplified views of the business or data object models can progressively improve. Because the simplified views are based on the actual content of the where-used list for each data element, the provided simplified views can be kept updated in real time or near real time and can adapt with each new usage of any data element of a business object, data object, etc. In addition, the current subject matter can also be applicable on other repository entities, such as for example global data types, service interfaces, message types, multi-dimensional views, business configurations, etc. A distribution function for each data element can optionally be generated based on these or other types of alternative data either in addition to or instead of the distribution functions based on where-used data.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
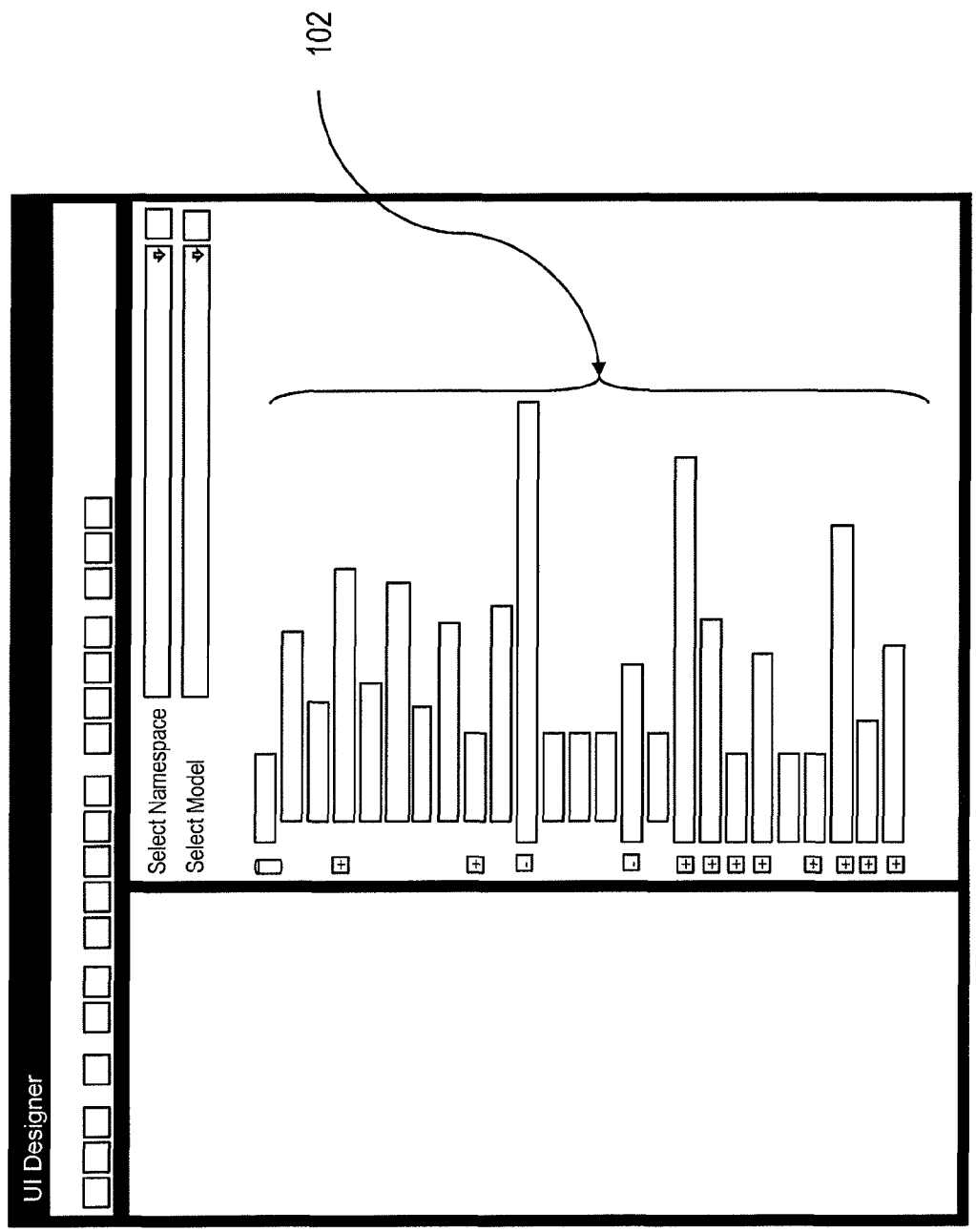
FIG. 1 is a user interface view illustrating an example of a hierarchy of available data elements.

In a consumer development tool, such as for example a user interface design program, the entire structure of data elements of a data object or business object that is available for integration with or incorporation into a user interface is typically displayed, for example based on the business object nodes of the business object. In one example, this structure can be displayed as a tree or other hierarchy 102 of data or business object nodes as is shown in the user interface 100 of FIG. 1. In many instances, views presenting this level of detail are too complex and not necessary for normal developer usage.

To address this and potentially other deficiencies in existing solutions, one or more implementations of the current subject matter provide methods, systems, articles or manufacture, and the like that can, among other possible advantages, provide simplified views of business objects, for example in development tools. The simplified views can in some implementations be based on a where-used ranking as discussed in greater detail below.

Figure 2:
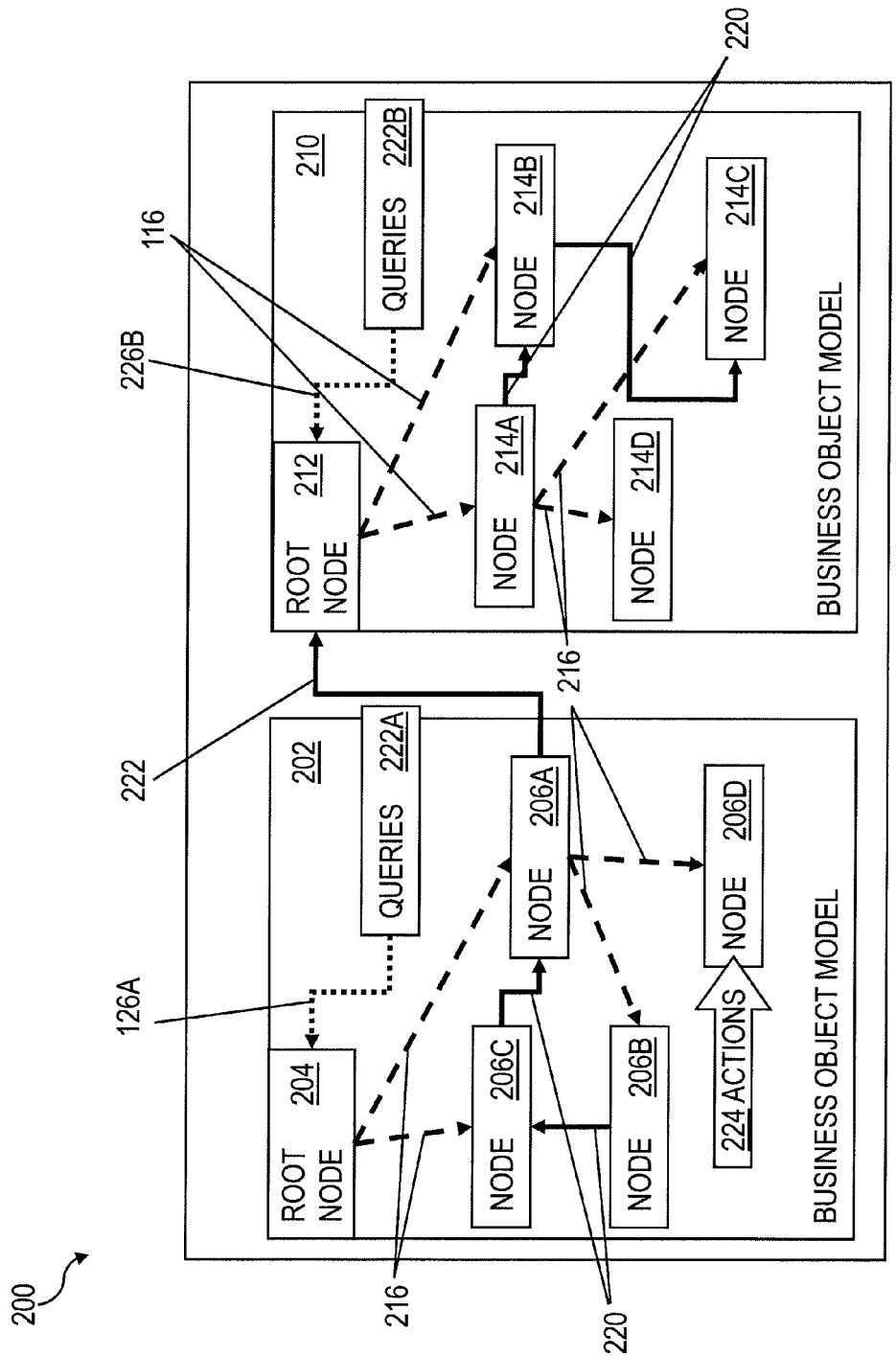
FIG. 2 is a diagram showing examples of types of data elements and dependencies between data elements.

FIG. 2 illustrates some examples of dependencies between data elements in a composition hierarchy of a software solution. As shown in FIG. 2, a first data object 202, which can be a business object, can include a first root node 204 as well as one or more first other nodes 206A, 206B, 206C, and 206D that are structured in a composition hierarchy. A second data object A10, which can also be a business object, can include a second root node 212 as well as one or more second other nodes 214A, 214B, 214C, and 214D that are also structured in the composition hierarchy.

Each node (including the root nodes 202 and 212 and the other nodes 206 and 214) can have one composition association to its parent node and one or more than one composition association child nodes. In FIG. 2, parent-child associations, which are one possible kind of dependency, are shown as dashed arrows 216. In addition, the nodes can have intra-object associations 220 and cross-object associations 222 that link a node of the first data object 202 to a node of the second data object 210. In FIG. 2, associations between nodes, both intra-object associations A20 and cross-object associations A22, which are another possible kind of dependency, are shown as solid arrows. FIG. 2 shows one of the first other nodes 206A of the first data object 202 having a cross-object association 222 with the root node 212 of the second data object 210, another first other node 206B of the first data object 202 having an intra-object association 220 with another first other node 206C of the first data object 202, which in turn has an intra-object association 220 with the first other node 206A, and a second other node 214A of the second data object 210 having an intra-object association 220 with another second other node 214B of the second data object 210 which in turn has an intra-object association 220 with yet another second other node 214C of the second data object 210. Other types of cross-object associations are possible, including associations between a root node of one data object and a non-root node of a second data object and associations between another node of one data object and an other node of the second data object. Other types of intra-object associations are also possible, for example between a root node of one data object and another node of another data object.

A data object 202, 210 can also include one or more queries 222A, 222B and actions 224 that can act upon the other elements of the data object. For example, as shown in FIG. 2, the first data object 202 includes an action 224 that is executed upon one of the first other nodes 206D. Also as shown in FIG. 2, the first data object 202 and the second data object 210 include queries 222A and 222B that can generate query results 226A and 226B, respectively. In some implementations, actions and queries can also be examples of dependencies. Dependencies can be unidirectional as noted above. In other words, a data element depending on another data element can include information about or some other indication of the dependency, but the other data element does not necessarily include any information about or some other indication of the dependency.

According to at least some implementations of the current subject matter, a development tool, other user interface, or the like can display simplified views of the available data elements within one or more data objects, business objects, or other data structures available within a software application based at least in part on a comprehensive meta-data repository containing where-used references of the data elements within the software application. In an illustrative but non-limiting example, a where-used list that includes references to other data elements associated with the software application can be analyzed for one or more data objects to be displayed in a development user interface to obtain a distribution function that indicates how many other elements available in the software application have a dependency upon the, such as for example a histogram, for each business object entity. This discrete distribution function can be used to determine the most used business object entities. This information can be used in a development tool to provide different views on the data models, such as for example a business object model.

Options for views can include, but are not limited to, a simple view, an expert view, and a complete view. In one illustrative implementation, a simple view can display a limited subset of the data elements in the data model, for example the 33% most-used data elements in the data model based on a where-used histogram or other distribution function. An expert view can optionally display the 66% most-used data elements, while the complete view can display all of the available data elements in the data model. Other view categorizations are possible.

Figure 3:
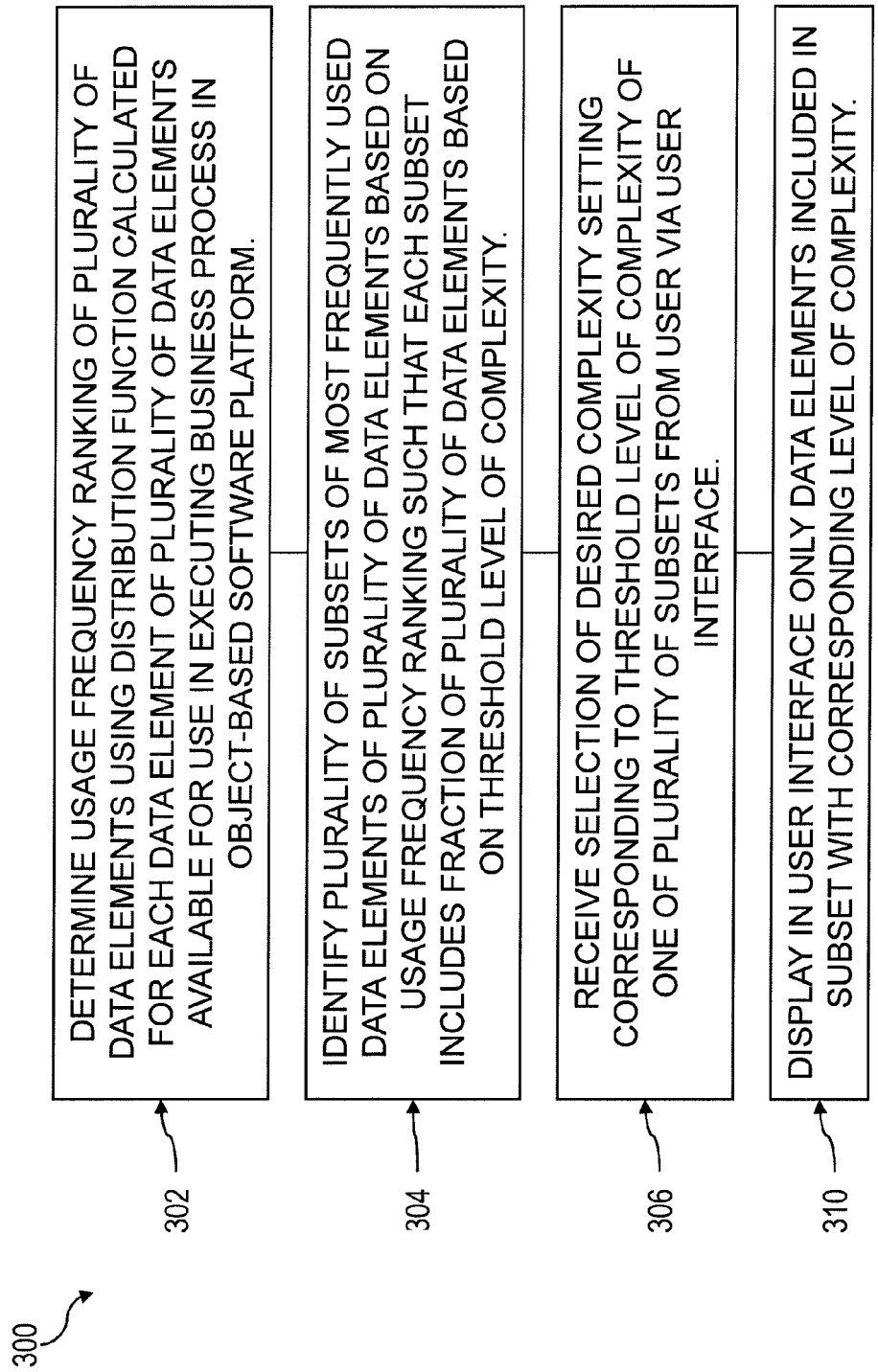
FIG. 3 is a process flow diagram illustrating aspects of a method consistent with implementations of the current subject matter.

A method that is consistent with at least one implementation of the current subject matter is illustrated in the process flow chart 300 of FIG. 3. At 302, one or more processors can determine, using a distribution function calculated for each data element of a plurality of data elements available for use in executing a business process in an object-based software platform or software solution, a usage frequency ranking of the plurality of data elements. Examples of calculations of the distribution functions are described below. In at least some implementations, where-used lists for the data elements can be used to identify a number of other data elements, etc. that reference each data element, and this criteria can be used to generate the usage frequency ranking.

At 304, a plurality of subsets of most frequently used data elements of the plurality of data elements can be identified based on the usage frequency ranking. Each subset of the plurality of subsets can include a fraction of the plurality of data elements based on a threshold level of complexity. For example, as discussed herein, a plurality of complexity settings can be defined, each including a predefined fraction or percentile of the plurality of data elements such that higher ranked data elements in the usage frequency ranking (i.e. more frequently used or referenced data elements) falling above the threshold fraction or percentile are included in the subset having that threshold fraction or percentile. At 306, a selection of a desired complexity setting is received at the one or more processors from a user via a user interface. The desired complexity setting corresponds to the threshold level of complexity of one of the plurality of subsets. Only the data elements included in the subset with the corresponding level of complexity are displayed at 310 in the user interface.

Where-used or other meta-data of a software solution can be stored in one or more meta-data repository. For example, a user interface of a software development application can employ a user interface controller in the backend that make use of a set of business objects. From the perspective of the software development application user interface, the information needed to identify the data, elements to be displayed according to a user-desired level of complexity or simplicity are stored and referenced in the meta-data repository. A meta-data repository can also include a reverse lookup index, such as for example a where-used list for each of the data elements available for display for display in the user interface. For example, for each specific business object data element, such as for example a business object node or a business object node element, can have a where-used list stored in the meta-data repository.

Figure 4:
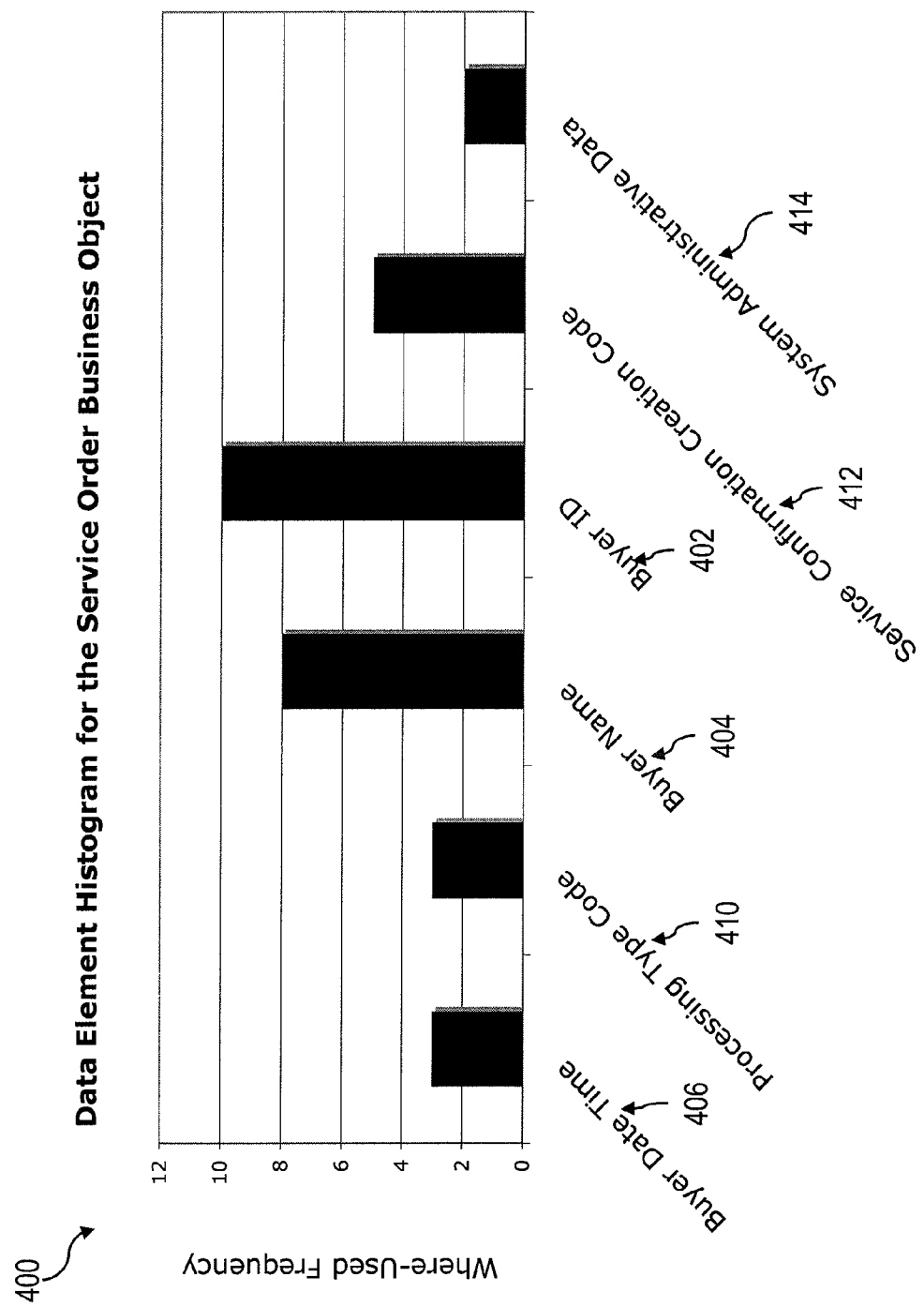
FIG. 4 is a graph showing an example of a distribution function for usage frequency of data elements in a business object.
Figure 5:
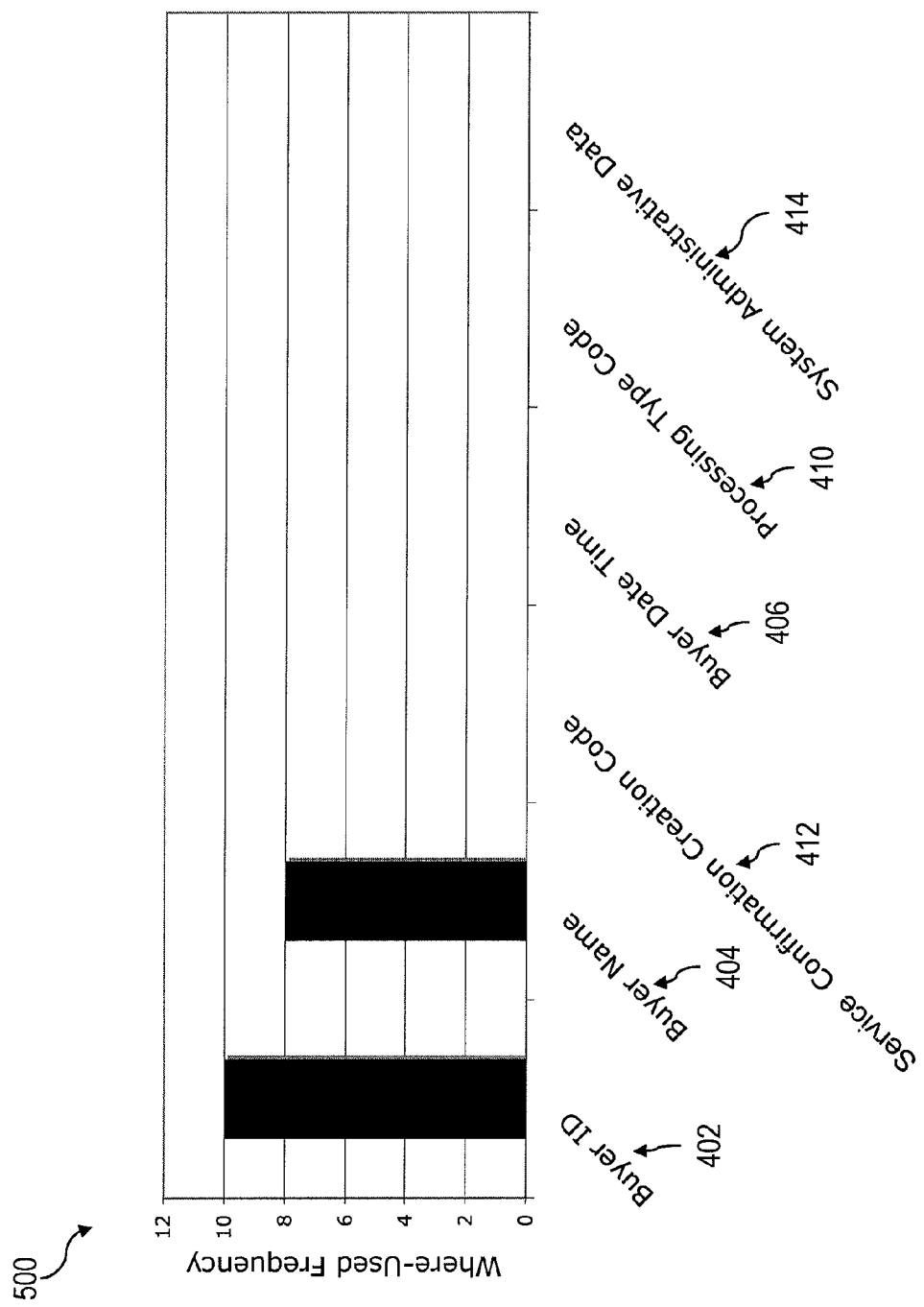
FIG. 5 is a histogram showing the data elements to be displayed according to a simple view.
Figure 6:
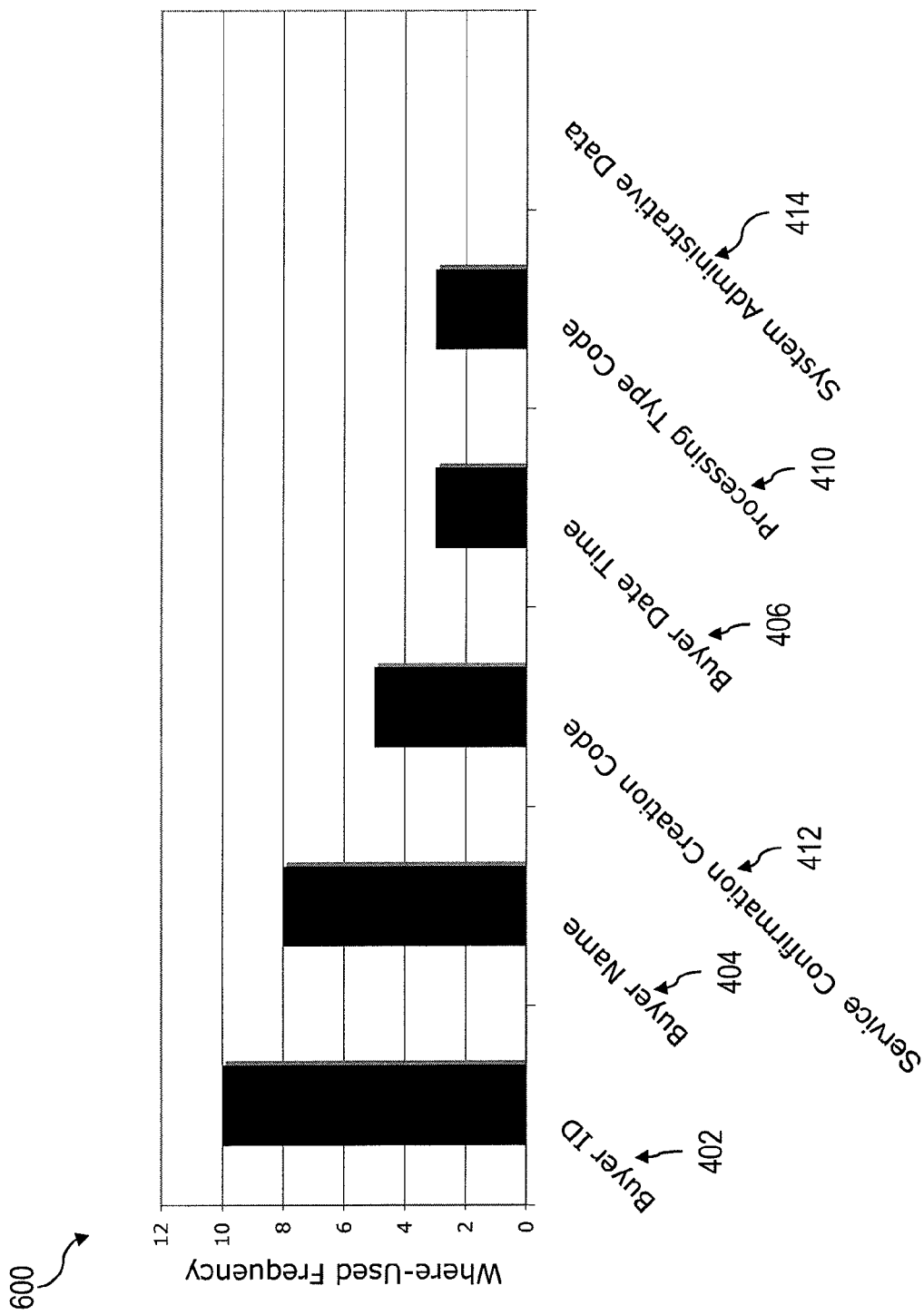
FIG. 6 is a histogram showing the data elements to be displayed according to a expert view.
Figure 7:
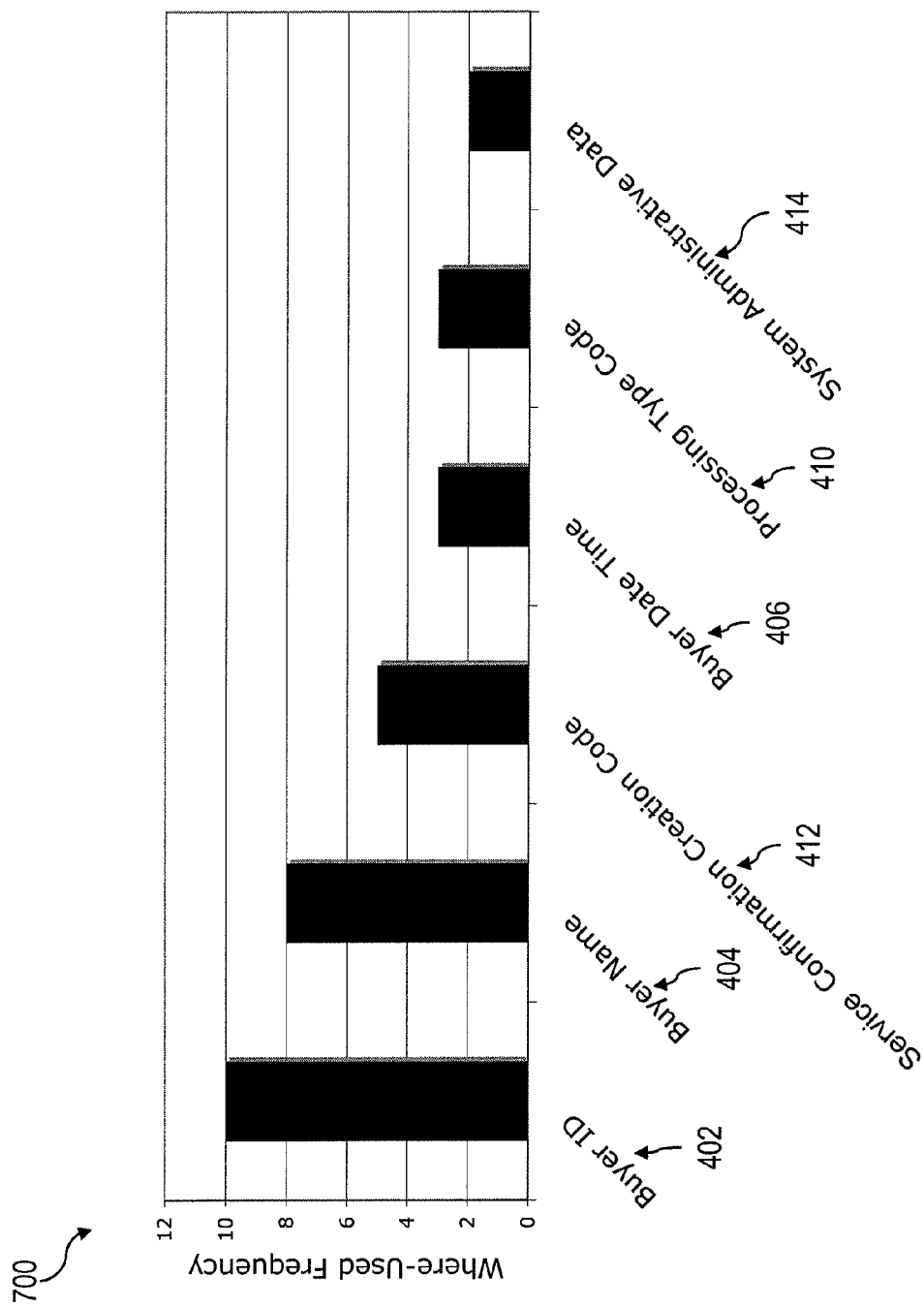
FIG. 7 is a histogram showing the data elements to be displayed according to a complete view.

By evaluating all where-used lists for the specific business object data elements, a discrete distribution function (or alternatively some other distribution function representative of a frequency of references to each data element) can be calculated for each data element. FIG. 4 shows an example of a histogram 400 for the frequency of where-used references to the six data elements of a service order business object. Based on the information in the histogram, the software development application can provide one or more choices for simplified views of the available data elements in the business objects or business objects. As noted above, in one example implementation, the simple view can optionally include the top third of the most referenced or most used data elements. In the service order business object example whose where-used histogram is shown in FIG. 4, only the data elements Buyer ID 402 and Buyer Name 404 are displayed in a simple view 500, which is shown in FIG. 5. In an expert view 600 shown in FIG. 6, that includes the top two thirds of the most used or most referenced data elements, the additional elements Buyer Date Time 406, Processing Type Code 410, and Service Confirmation Creation Code 412 can also be displayed. In the example of FIGS. 4-7, the fifth and sixth most used data elements, Buyer Date Time 406 and Processing Type Code 410, have the same usage frequency and are thus both displayed in the top two thirds expert view 600 of FIG. 6. In the complete view 700 shown in FIG. 7, all of the data elements, including System Administrative Data 414 can be displayed.

More heuristic and sophisticated ranking is also possible within the scope of the current subject matter. For example, the evaluation of the where-used lists can be restricted to specific business application development areas like customer relationship management, supplier relationship management, supply chain management, financials, product lifecycle management, human capital management, or the like with the assumption that the where-used histogram differs from business area to business area. In addition, more view types can be introduced which can also be user role dependent. For example, an end user can be in another role than a software developer, and can therefore have simplified view options that are more closely tailored to the typical needs of such a user.

The different view categories like simple view, expert view, and complete view can be selected in a development tools in a variety of ways. In some implementations, the choice of a view category can include a logical selection presented as an option to choose one option from a list of N options. Such selections can be displayed in a variety of ways, for example as a drop-down list box, a radio button group, different tab strip views, menu items with a selection mark or marks, and the like.

The evaluation of the where-used histogram or other distribution function for the data elements of one or more specific business objects or data objects can in some implementations depend on the user interface that provides the view of the available data elements. For example, if a development tool, such as for example a user interface designer, uses a tree control for visualization of the available data elements, the user interface can typically start with the business objects nodes. In the simple developer business object view the developer can be presented with a limited fraction of the available business object nodes (for example the most frequently used or referenced third of the nodes as suggested above). The distribution functions can optionally be extended to all children and associated nodes. In some examples, it can be possible to select a business object node in the tree control and to change the actual simple view to the expert view only for this selected node. A development tool such as a user interface designer can optionally show all available actions of a business object for the configuration of a toolbar control. A toolbar control can in some examples, include only toolbar buttons bound to business object actions. In this development scenario, only the actions are relevant and it may not be necessary to display any other business object entity to the developer. Also, the actions can be categorized into the simple view, the expert view, and the complete view just by evaluating the where-used histogram of these actions.

Due to the assignment of business object entities to the specific simplified views being calculable at runtime based on the where-used lists, the available views of varying levels of complexity or simplicity can dynamically reflect the actual content of the meta-data repository and can be continuously or nearly continuously kept updated. It can therefore be unnecessary to assign business objects data elements to each of the available simplified views at design time. Furthermore, new categories of data elements can be readily created and unnecessary categories can be removed without requiring input from the developer of the specific business object.

The content volume of the meta-data repository can grow over the lifetime of the development solution and can therefore become very large. For very large content in the meta-data repository, it might be not convenient to evaluate the where-used lists in real time. In such a case, the where-used histograms or other distribution functions for use or reference of the data elements of a business object or data object can be generated in batch mode, for example each day, at start-up, or on some other periodic frequency. The frequency of the calculation can depend on the size of the meta-data repository content and on the processing cycles required for the calculation based on the concrete content. In some implementations, the frequency with which distribution functions are calculated can be adapted within the lifetime of the software solution.

Figure 8:
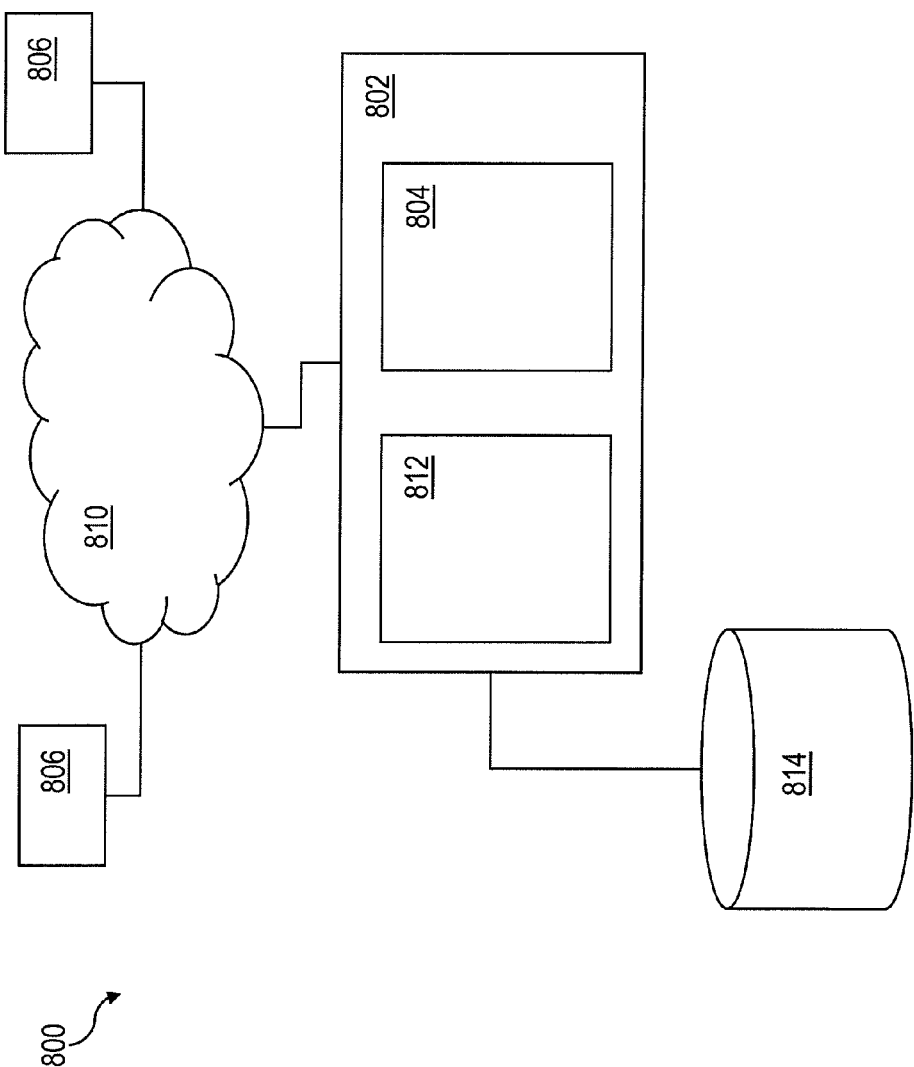
FIG. 8 is a system diagram showing a system consistent with at least some implementations of the current subject matter.

FIG. 8 shows an example of a system 800 consistent with the current subject matter. A computing system 802 that can include one or more programmable processors, which can be collocated, linked over one or more networks, etc., can execute one or more first modules 804 that provide one or more software application functions accessible to local users and/or to remote users accessing the computing system 802 from one or more client machines 806 over a network connection 810. One or more user interface screens produced by the one or more first modules can be displayed to a user, either via a local display or via a display associated with one of the client machines 806. A simplifier module 812 can perform functions as described herein to determine one or more user interface views of varying complexity that can be presented to users via the client machine(s) 806 or at the local system 802. These views can be based on a distribution function derived from mete-data, for example one or more where-used lists that are stored in a repository 814 accessible to the simplifier module 812 either by a local or networked connection.

Aspects of the subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. A client and server are generally, but not exclusively, remote from each other and typically interact through a communication network, although the components of the system can be interconnected by any form or medium of digital data communication. Examples of communication networks include, but are not limited to, a local area network ("LAN"), a wide area network ("WAN"), and the Internet. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   determining, by at least one processor using a distribution function calculated for each data element of a plurality of data elements available for use in executing a business process in an object-based software platform, a usage frequency ranking of the plurality of data elements;
   identifying, by the at least one processor based on the usage frequency ranking, a plurality of subsets of most frequently used data elements of the plurality of data elements, each subset of the plurality of subsets comprising a fraction of the plurality of data elements based on a threshold level of complexity;

receiving, by the at least one processor, a selection of a desired complexity setting, the desired complexity setting corresponding to the threshold level of complexity of one of the plurality of subsets; and displaying, by the at least one processor in the user interface, only the data elements included in the subset with the corresponding level of complexity.

2. A method as in claim 1, wherein the distribution function comprises at least one histogram indicating a relative number of calls to each of several types of data elements by other data elements in a software solution.

3. A method as in claim 1, further comprising calculating the distribution function based on a where-used index that lists, for each data element of the plurality of data elements, all other data elements having a dependency upon that data element.

4. A method as in claim 3, wherein the dependency comprises one or more of a query, an action, a parent-child association, an intra-object association, and a cross-object association.

5. A method as in claim 3, wherein the calculating occurs at runtime such that the distribution function reflects all updates to the where-used index.

6. A method as in claim 3, further comprising selecting the where-used list for calculation of the distribution function based on at least one of a user role of the user and a specific business application development area within which the business process is executed.

7. A non-transitory computer program product comprising a machine-readable medium storing instructions that, when executed by at least one programmable processor, cause the at least one programmable processor to perform operations comprising:

determining, using a distribution function calculated for each data element of a plurality of data elements available for use in executing a business process in an object-based software platform, a usage frequency ranking of the plurality of data elements;

identifying, based on the usage frequency ranking, a plurality of subsets of most frequently used data elements of the plurality of data elements, each subset of the plurality of subsets comprising a fraction of the plurality of data elements based on a threshold level of complexity;

receiving a selection of a desired complexity setting, the desired complexity setting corresponding to the threshold level of complexity of one of the plurality of subsets; and displaying, in the user interface, only the data elements included in the subset with the corresponding level of complexity.

8. A computer program product as in claim 7, wherein the distribution function comprises at least one histogram indicating a relative number of calls to each of several types of data elements by other data elements in a software solution.

9. A computer program product as in claim 7, wherein the operations further comprise calculating the distribution function based on a where-used index that lists, for each data element of the plurality of data elements, all other data elements having a dependency upon that data element.

10. A computer program product as in claim 9, wherein the dependency comprises one or more of a query, an action, a parent-child association, an intra-object association, and a cross-object association.

11. A computer program product as in claim 9, wherein the calculating occurs at runtime such that the distribution function reflects all updates to the where-used index.

12. A computer program product as in claim 9, wherein the operations further comprise selecting the where-used list for calculation of the distribution function based on at least one of a user role of the user and a specific business application development area within which the business process is executed.

13. A computer program product as in claim 7, wherein each data element includes one of a node, an action, a query, an association, an action parameter, a query input parameter, and a node element.

14. A system comprising:

at least one programmable processor; and a machine-readable medium storing instructions that, when executed by the at least one processor, cause the at least one programmable processor to perform operations comprising:

determining, using a distribution function calculated for each data element of a plurality of data elements available for use in executing a business process in an object-based software platform, a usage frequency ranking of the plurality of data elements;

identifying, based on the usage frequency ranking, a plurality of subsets of most frequently used data elements of the plurality of data elements, each subset of the plurality of subsets comprising a fraction of the plurality of data elements based on a threshold level of complexity;

receiving a selection of a desired complexity setting, the desired complexity setting corresponding to the threshold level of complexity of one of the plurality of subsets; and displaying, in the user interface, only the data elements included in the subset with the corresponding level of complexity.

15. A system as in claim 14, wherein the distribution function comprises at least one histogram indicating a relative number of calls to each of several types of data elements by other data elements in a software solution.

16. A system as in claim 14, wherein the operations further comprise calculating the distribution function based on a where-used index that lists, for each data element of the plurality of data elements, all other data elements having a dependency upon that data element.

17. A system as in claim 16, wherein the dependency comprises one or more of a query, an action, a parent-child association, an intra-object association, and a cross-object association.

18. A system as in claim 16, wherein the calculating occurs at runtime such that the distribution function reflects all updates to the where-used index.

19. A system as in claim 16, wherein the operations further comprise selecting the where-used list for calculation of the distribution function based on at least one of a user role of the user and a specific business application development area within which the business process is executed.

20. A system as in claim 14, wherein each data element includes one of a node, an action, a query, an association, an action parameter, a query input parameter, and a node element.

* * * * *